United States Patent
Hannum

(10) Patent No.: US 12,021,366 B2
(45) Date of Patent: Jun. 25, 2024

(54) NEUTRAL BUSBAR STAND ASSEMBLY AND METHOD

(71) Applicant: Bentek Corporation, San Jose, CA (US)

(72) Inventor: Robert Hannum, San Jose, CA (US)

(73) Assignee: Bentek Corporation, San Jose, CA (US)

( * ) Notice: Subject to any disclaimer, the term of this patent is extended or adjusted under 35 U.S.C. 154(b) by 158 days.

(21) Appl. No.: 17/867,222

(22) Filed: Jul. 18, 2022

(65) Prior Publication Data

US 2024/0022058 A1   Jan. 18, 2024

(51) Int. Cl.
H02G 5/02 (2006.01)

(52) U.S. Cl.
CPC .................... H02G 5/025 (2013.01)

(58) Field of Classification Search
USPC .......................................... 172/68.2
See application file for complete search history.

(56) References Cited

U.S. PATENT DOCUMENTS

| | | | | |
|---|---|---|---|---|
| 2,318,859 A * | 5/1943 | Huguelet | ............... | H02G 5/025 174/70 B |
| 2,511,995 A * | 6/1950 | Robertson | ............ | H01R 9/2483 439/724 |
| 2,980,824 A * | 4/1961 | Kobryner | ............... | H02B 1/056 361/627 |
| 3,767,977 A * | 10/1973 | Bachman | ............... | H02B 1/056 361/636 |
| 4,931,898 A * | 6/1990 | Cole | ....................... | H02B 1/056 361/648 |
| 5,322,458 A * | 6/1994 | Hennemann | ......... | H01R 9/2483 439/787 |
| 5,343,356 A * | 8/1994 | Hancock | .................. | H02B 1/26 174/68.2 |
| 6,122,160 A * | 9/2000 | Hannula | ............... | H02B 1/056 174/68.2 |
| 10,985,429 B2 * | 4/2021 | Takase | ................ | H01M 50/507 |
| 11,621,462 B2 * | 4/2023 | Dawley | ............... | H01M 50/517 429/158 |
| 11,646,458 B2 * | 5/2023 | Yasuda | ............... | H01M 50/507 429/158 |
| 2011/0127061 A1 * | 6/2011 | Gotou | .................... | H02M 7/003 174/68.2 |
| 2012/0040226 A1 * | 2/2012 | Kim | ..................... | H01M 50/264 429/158 |
| 2014/0205889 A1 * | 7/2014 | Kim | ...................... | H01M 50/55 429/158 |
| 2014/0212732 A1 * | 7/2014 | Ichikawa | ............ | H01M 50/507 174/68.2 |

(Continued)

*Primary Examiner* — Krystal Robinson
(74) *Attorney, Agent, or Firm* — Shih IP Law Group, PLLC

(57) ABSTRACT

A neutral busbar stand assembly is provided which includes a pair of connectors fixing a position of at least one neutral busbar. Each of the pair of connectors including a top portion having a first and second connection end tabs, the first and second connection end tabs being secured in a bore of a neutral bar by a wire binding screw, and at least one downwardly extending leg from the top portion of the connector; and a base joining the pair of connectors via the downwardly extending legs, wherein a neutral busbar is mounted on the base and adjacent the downwardly extending legs of each of the pair of connectors.

20 Claims, 5 Drawing Sheets

(56) References Cited

U.S. PATENT DOCUMENTS

| | | | | |
|---|---|---|---|---|
| 2015/0380711 A1* | 12/2015 | Oechsle | ............. | H01M 50/553 |
| | | | | 429/121 |
| 2016/0111836 A1* | 4/2016 | Herring | ................. | H01R 25/16 |
| | | | | 439/111 |
| 2016/0149388 A1* | 5/2016 | Lee | ......................... | H02B 1/20 |
| | | | | 361/624 |
| 2016/0196896 A1* | 7/2016 | Yang | ....................... | H01B 5/02 |
| | | | | 174/133 B |
| 2018/0048127 A1* | 2/2018 | Liang | ....................... | H02B 1/20 |
| 2021/0280950 A1* | 9/2021 | Dorresteyn | ........ | H01M 10/0404 |
| 2023/0246311 A1* | 8/2023 | Kim | ................... | H01M 50/269 |
| | | | | 429/158 |

\* cited by examiner

NEUTRAL BUSBAR STAND ASSEMBLY AND METHOD

FIELD OF THE INVENTION

This invention relates generally to neutral busbar stand assembly including at least one neutral busbar electrically and mechanically coupled together and the method of making the neutral busbar stand assembly.

BACKGROUND OF THE INVENTION

In electrical enclosures or systems, neutral busbars are used to electrically connect several wires to one location in an enclosure or system. The electrical connections utilizing neutral busbars are very numerous covering ground connections to current carrying assemblies. Since each electronic assembly utilizing neutral busbars can vary greatly from application to application, the range of different application requirements outnumber the styles of neutral busbars available which leads to compromising designs to take into consideration the limitation as to the busbars available. Having more than what is needed or not exactly what is needed creates inefficiencies which can become very costly as the size or number of the systems increase.

Consequently, there is a need for a simplified system or methodology to economically and universally connect all sizes and manner of neutral busbars, both mechanically and electrically without any special need to include one or more unique style of busing or aperture.

SUMMARY OF INVENTION

The present invention overcomes the foregoing and other shortcomings and drawbacks of neutral busbar stand assemblies. While the invention will be described in connection with certain embodiments, it will be understood that the invention is not limited to these embodiments. On the contrary, the invention includes all alternatives, modifications, and equivalents as may be included within the spirit and scope of the present invention.

The present invention solves issues with mounting and electrically connecting numerous styles of neutral busbars in a universal stand (bracket) assembly. The stand assembly may be used in locations that a neutral busbar may be used. Openings may be drilled in any back panel and create a grounding location for the stand assembly. Openings may also be drilled into a busbar and create an electrical location for the stand assembly. The stand assembly adds more diversity and standardization to neutral busbar applications which number in the hundreds of thousands every year.

In one embodiment of the present invention, a neutral busbar stand assembly including a base which has a mounting method, such as openings, and connectors or connection end tabs that may be at various angles and locations which are used to connect to any style of neutral busbar. The connectors mimic busbar or cabling that is used to connect to one or more neutral busbars to the base and thus the location to which the base is mounted. The neutral busbar stand assembly may be used for current carrying assemblies as well as Electrical Grounding Connections (EGC).

The present invention includes a neutral busbar stand assembly in which first and second neutral busbars may be coupled together with a pair of connectors and base joining the connectors, wherein each connection end tab of a top portion of the pair of connectors are received in respective wire-receiving bores of a first neutral busbar and the second neutral busbar is mounted on the base and secured to the grounded busbar, thereby assembling the first and second neutral busbars to each other. Further, three neutral busbars may be electrically and mechanically joined together with the neutral busbar stand assembly. Two of the neutral busbars are joined by the pair of connectors, and the third neutral busbar is mounted on the base of the stand assembly and secured to the grounded busbar by mounting screws via threaded openings of the grounded busbar or securing bolts and nuts via openings of the grounded busbar, the grounded busbar mated below the base of the stand assembly. Although the neutral busbar stand assembly of the present invention may secure together two or three neutral busbars, any number of neutral bus bars may be joined together in accordance with the present invention.

In each of the embodiments of the present invention, the neutral busbars are made from aluminum or copper, but is not limited to these materials. Accordingly, the neutral busbars may be made of any electrically conductive material and die cast, stamped, or extruded. Each of the neutral busbars is generally elongated in overall shape with a rectangular transverse cross-section, having generally planar, parallel front and rear surfaces, generally planar, parallel top and bottom surfaces, and generally planar, parallel end surfaces.

A plurality of spaced bores extend through the neutral busbar from the front surface to the rear surface. These bores are typically not threaded, although they may be threaded. The bores are sized and adapted to receive grounding wires from the rear thereof. The bores within each of the neutral busbars are typically the same diameter and have a defined pitch, i.e. the distance between the centers of adjacent bores. The neutral busbars are generally less than a foot long, however, may be three or four feet long depending upon the size of the breaker box or electrical enclosure which contains them. One common size bore for a neutral busbar is approximately a quarter inch in diameter, accommodating wire gauges from 12 to 4, increasing in wire diameter. In addition, the bores may be of a larger diameter as to accommodate larger gauge wires, e.g. 2 to 0 gauge wires. One of the advantages of the present invention is that neutral busbars made from different manufacturers, having different pitches may be joined together. In addition, neutral busbars having different lengths and bores of different diameters may be joined together in accordance with the present invention.

In one embodiment, in order to secure the cables or wires inside the bores of the neutral busbars, a plurality of spaced, threaded openings extend downwardly from the top surface of the neutral busbar into the bores of the neutral busbar. A plurality of wire-binding screws are engaged in the threaded openings and when rotated advance into the bores of the neutral busbar, thereby trapping or securing the grounding wires or cables between the bottom of the bores and the bottoms of the wire-binding screws. In another embodiment, there are no threads in the openings of the neutral busbar or the stand assembly. In the embodiment, there are threads in a busbar, which may be grounded, or securing plate below the bracket assembly to which mounting screws secure the neutral busbar and stand assembly to the busbar. In another embodiment, securing bolts and hexagonal nuts secure the neutral busbar and stand assembly to the plate.

In an embodiment of the present invention, each of the connectors has a top body portion and at least one leg extending downwardly from the top body portion to the base of the stand assembly.

In an embodiment of the present invention, each neutral connector of the stand assembly is generally T-shaped, having a leg extending downwardly from a top body portion. The stand assembly is used to connect two or more neutral busbars. In accordance with the present invention, the neutral connectors may assume other configurations and shapes besides a T-shape, as will be described in more detail below.

In an embodiment of the present invention, each neutral connector of the stand assembly is generally pi-shaped, having two spaced, parallel legs extending downwardly from a top body portion. The stand assembly is used to connect two or more neutral busbars. In accordance with the present invention, the neutral connectors may assume other configurations and shapes besides a pi-shape, as will be described in more detail below.

In each of the embodiments of the present invention, the connection end tabs of the top body portion of the connectors are inserted into the bores of the neutral busbars and the wire-binding screws are tightened in order to secure the connection end tab in the bores of the neutral busbars. No additional brackets, bolts or hardware may be necessary to secure the connectors to the neutral busbars. Further, a mounting screw secures a neutral bus bar and stand assembly via through openings to a threaded opening of a busbar or plate below the stand assembly.

These and other objects and advantages of the present invention will be more readily apparent from the following drawings.

BRIEF DESCRIPTION OF THE DRAWINGS

The accompanying drawings, which are incorporated in and constitute part of this specification, illustrate embodiments of the invention and, together with the general description of the invention given above, and the detailed description of the embodiments given below, serve to explain the principles of the invention. Further, one of ordinary skill in the art would understand or contemplate that different embodiments and their aspects may be combined or aspects of individual embodiment may be removed.

DETAILED DESCRIPTION OF THE EMBODIMENTS

Figure 1:
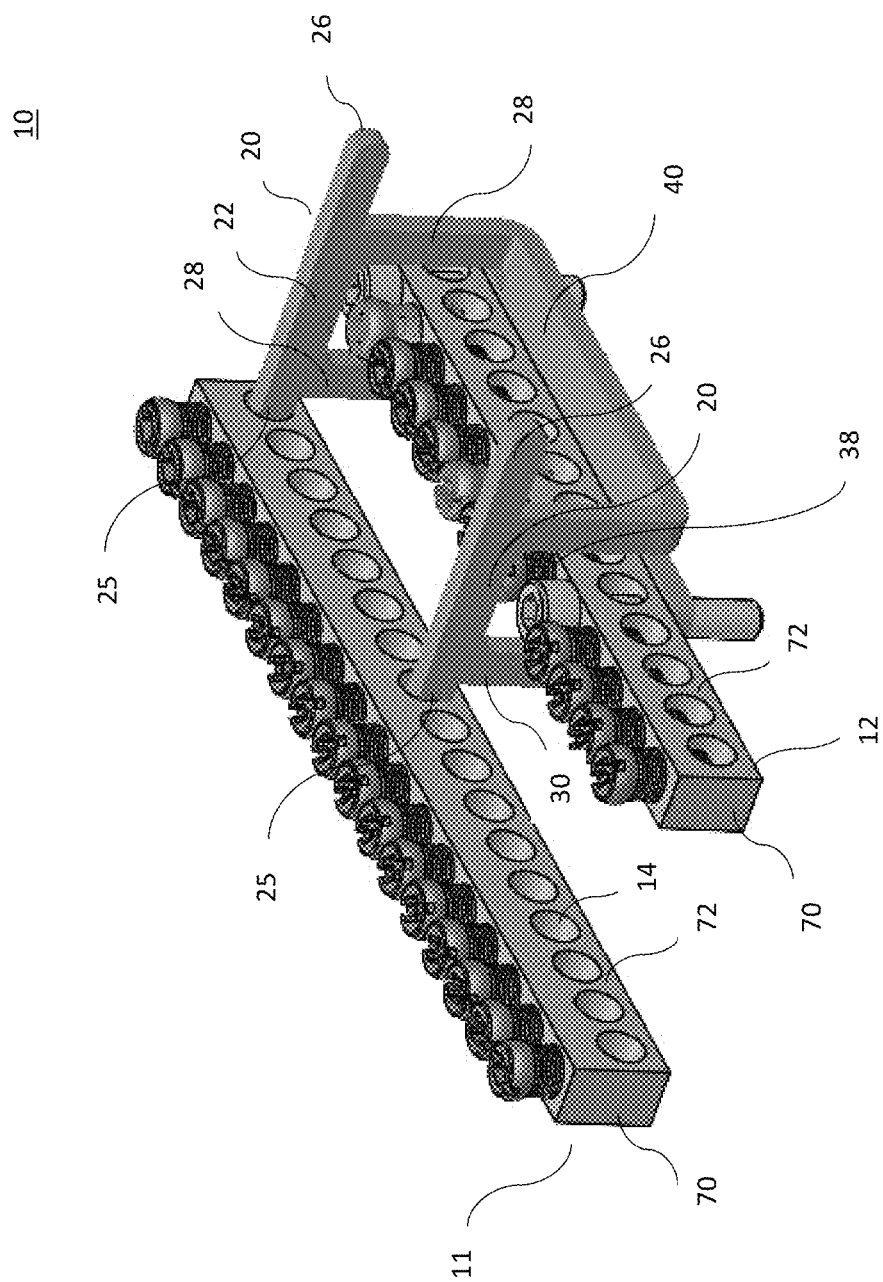
FIG. 1 is a perspective view of an embodiment of a neutral busbar stand assembly.

In accordance with an embodiment of the present invention, FIG. 1 illustrates a neutral busbar stand assembly 10 including a pair of pi-shaped connectors 20 joined to base 40 that secures together a first neutral busbar 11 and a second neutral busbar 12. Each of the pair of pi-shaped connectors 20 and base 40 is illustrated in more detail in FIGS. 2-4 and will be described in more detail below. Due to the configuration of the pair of pi-shaped connectors 20 and base 40, the second neutral busbar 12 is positioned below the first neutral busbar 11 and between the legs of the pi-shaped connectors 20 which are joined to the base 40. The second neutral busbar 12 is mounted on the base 40 and secured to a busbar which may be grounded and is mated below base 40. That is, the second neutral busbar 12 is mounted generally below and inward from the first neutral busbar 11. Base 40 and the connection end tabs 25, 26 of the pi-shaped connectors 20 are spaced from each other so that the mounted first and second neutral busbars 11, 12 are positioned to allow a clear view and easy access of cabling or wiring 80 in each opening or bore.

Each of the first and second neutral busbars 11, 12 has a pair of opposed end surfaces 70 (only one being shown) which define a length L of the neutral busbar. Each of the neutral busbars 11, 12 also has a generally planar front surface 72 and a parallel, generally planar rear or back surface. Each of the neutral busbars 11, 12 has a top surface 76 and a bottom surface 78.

Although the first and second neutral busbars 11, 12 are illustrated in FIG. 1 as having an identical height, width, and length, they may have different lengths, widths, or heights from each other in accordance with the present invention. Further, each of the neutral busbars 11, 12 has a plurality of spaced bores 14 extending through the neutral busbar from the front surface 72 to the rear surface 74. Each of these bores 14 is generally circular in nature, although the bores may assume other configurations or shapes in accordance with the present invention. Within a neutral busbar, each of the bores 14 is typically the same diameter; however, the diameters may vary within a neutral busbar. Wires may pass through the rear surface 74 of the neutral busbar into the bores 14 of the neutral busbar. Thus, each neutral busbar may hold as many wires as there are bores within the neutral busbar, minus the two bores in which a portion of the connection end tabs 25, 26 are located.

In addition, each of the neutral busbars 11, 12 has a plurality of spaced, threaded openings 17 extending downwardly from the top surface 76 of the neutral busbar into one of the bores 14. Each of the threaded openings 17 has a wire-binding screw 50 threadedly engaged therein. Thus, each neutral busbar may hold as many wires as there are bores within the neutral busbar minus the two threaded openings in which the neutral busbar is mounted on the base 40 and secured to a grounded busbar.

Although one configuration of wire-binding screw is illustrated, the wire-binding screw may assume other configurations in accordance with the present invention.

Figure 2:
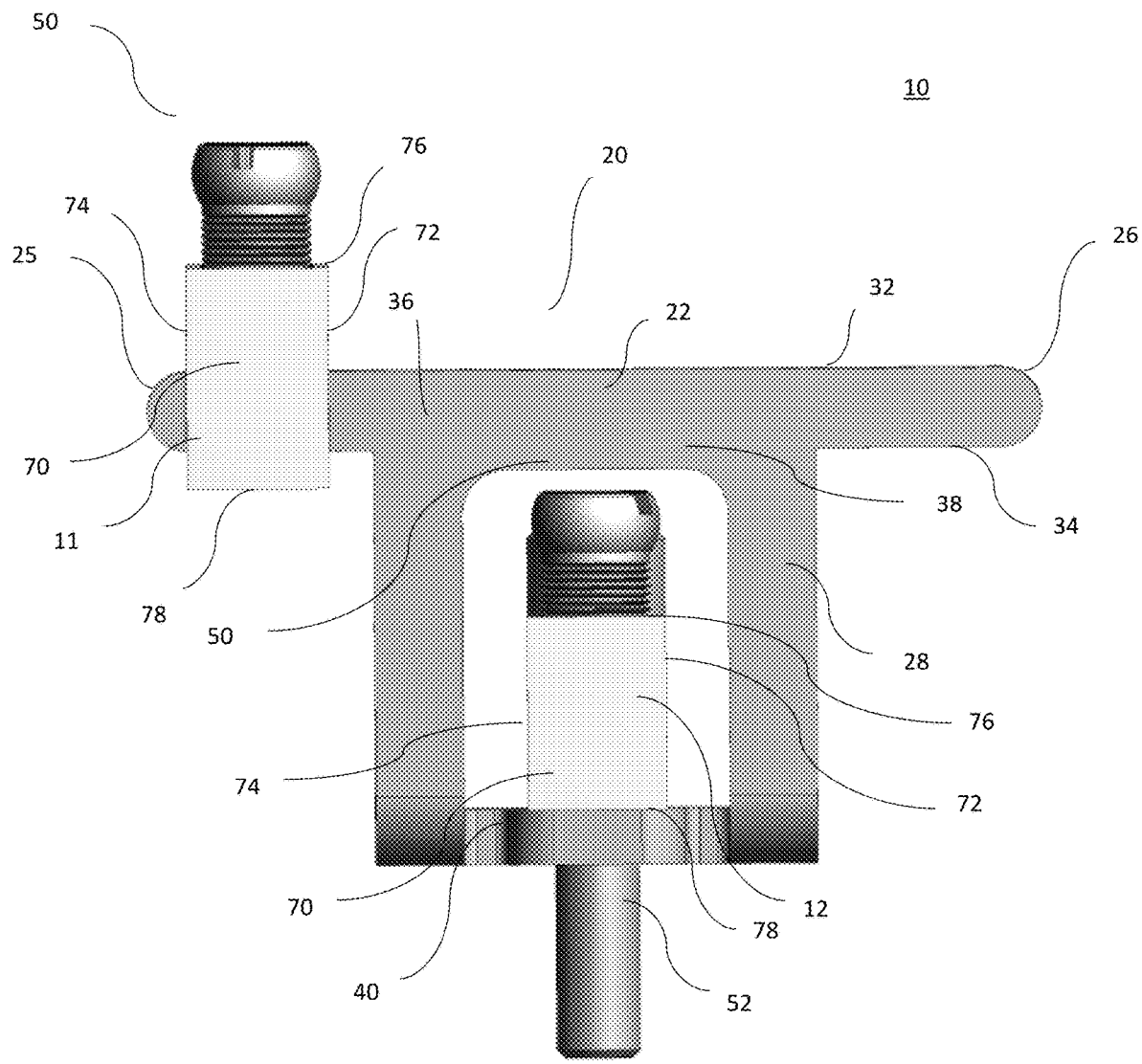
FIG. 2 is a cross-sectional view of FIG. 1.

As shown in FIG. 2, which is a cross-sectional view of FIG. 1, each of the neutral busbars 11, 12 also has a generally planar front surface 72 and a parallel, generally planar rear or back surface 74 which define the width W of the neutral busbar. And, each of the neutral busbars 11, 12 has a top surface 76 and a bottom surface 78, which define the height H of the neutral busbar.

Figure 3:
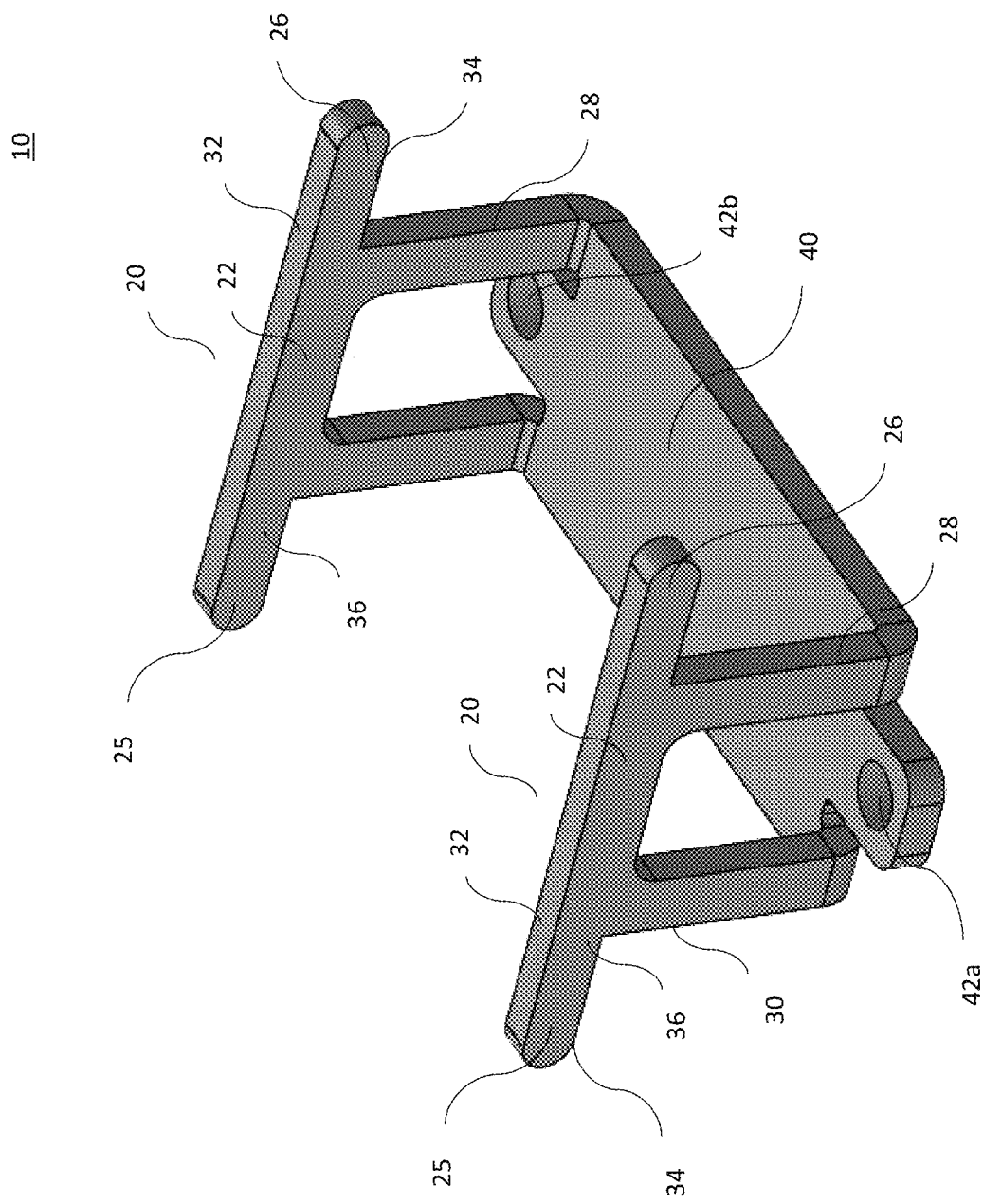
FIG. 3 is a perspective view of an embodiment of the neutral busbar stand assembly of FIG. 1.

In accordance with an embodiment of the present invention, FIG. 3 illustrates a neutral busbar stand assembly including a pair of pi-shaped connectors 20 joined to base 40 and cast or extruded from aluminum or copper. Each of the pi-shaped connectors 20 may be generally pi-shaped and have a top portion 22, a pair of connection end tabs 24, and a pair of leg portions 28. Each of the pi-shaped connectors 20 may be joined to base 40 in a generally perpendicular manner. One of ordinary skill in the art would understand though, that the pi-shaped connectors 20 may be joined to base 40 at various angles to accommodate different configurations and/or size and shapes of neutral busbars. Each of the leg portions 28 of the pi-shaped connectors 20 extends downwardly from the bottom of the top portion 22 to base 40, where the top portion 22 and leg portions 28 forming a substantially pi-shape configuration. The leg portions 28 may generally be parallel to each other. One of ordinary skill in the art would understand though that the leg portions 28 may also be at various angles relative to each other to accommodate different configurations and/or size and shapes of neutral busbars. A top portion of one of the leg portion 28 which extends downwardly from the bottom of the top portion 22 to base 40 includes a front surface or shoulder 30 which functions to provide a stop preventing the first neutral busbar 11 from moving further inwardly. Further, the top portion of the other leg portion 28 which extends downwardly from the bottom of the top portion 22 to base 40 includes a front surface or shoulder 30 which functions to provide a stop preventing a third neutral busbar from moving further inwardly.

The pi-shaped connectors 20 has a generally planar top surface 32, a generally planar bottom surface 34, and a pair of generally planar side surfaces 36, which define the width of the pi-shaped connector 20. Extending outwardly to the left from the top portion 22 of the body portion 21 is a first connection end tab 25. Extending outwardly to the right from the top portion 22 of the body portion 21 is a second connection end tab 26. The first connection end tab 25 is located in line with the second connection end tab 26 and above the leg portions 28. One of ordinary skill in the art, however, would understand that the first connection end tab 25 may be angled from the second connection end tab 26 and thus not in line with each other. This variation would accommodate various configurations of neutral busbars. Between the leg portions 28 of the pi-shaped connector 20 is a U-shaped slot 38 in which the second neutral busbar 12 is located, as shown in FIGS. 1 and 2. In this embodiment of the present invention, the pi-shaped connectors 20 is of a uniform width and each of the first and second connection end tabs 25, 26 has a generally rectangular cross-sectional configuration, as shown in FIG. 2. One of ordinary skill in the art would understand that the cross-sectional configuration of first and second connection end tabs 25, 26 may also be circular or any suitable shape to fit within a bore of a neutral busbar.

The configuration of the pi-shaped connectors 20 and base 40 functions to position the first, second, and third neutral busbars 11, 12, and 13 relative to each other such that an electrician may easily see and access wiring or cables received into each opening. Further, the shoulder 30 abuts the front surface 72 of the first neutral busbar 11, thereby preventing the first neutral busbar 11 from moving inwardly past the shoulder 30 or downwardly and ensuring adequate spacing between the first, second, and third neutral busbars 11, 12, and 13.

Figure 4:
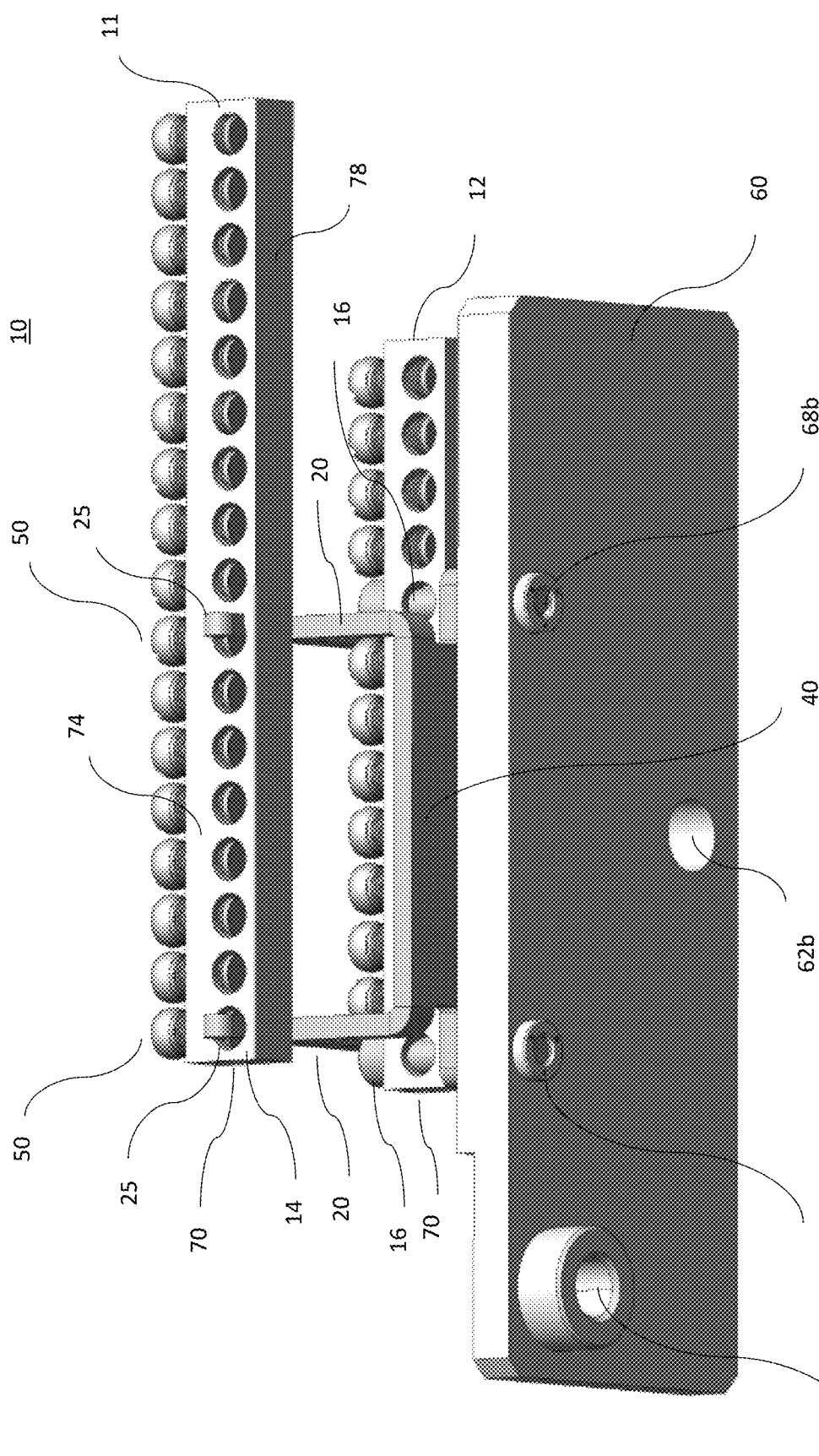
FIG. 4 is a perspective view of an embodiment of a neutral busbar stand assembly, neutral busbars, and securing plate.

As shown in FIG. 4, the first connection end tab 25 of the pi-shaped connector 20 is received in the outermost bore 14 of the first neutral busbar 11 and secured therein with one of the wire-binding screws 50. Each of the first and second neutral busbars 11, 12 has a pair of opposed end surfaces 70 (only one being shown) which define a length L of the neutral busbar. Each of the neutral busbars 11, 12 also has a generally planar front surface and a parallel, generally planar rear or back surface 74. Each of the neutral busbars 11, 12 has a top surface and a bottom surface 78.

In one embodiment, the second neutral busbar 12 is mounted to base 40 and secured via two securing screws 16 to a securing plate 60. Securing screws 16 are received through an aligned pair of openings 112a and 112b in the neutral busbar 12, openings 42a, 42b in the base 40, and openings 68a, 68b in the securing plate 60. The opening 68b may be threaded and engages a threaded end portion 76 of the securing screw 16. In another embodiment, securing bolts 52 are received through an aligned pair of openings 112a and 112b in the neutral busbar 12, openings 42a, 42b in the base 40, and openings 68a, 68b in the securing plate 60. A hexagonal nut 56 is threaded on an upper portion 54 of the securing bolt 52. Thus the securing bolts 52, securing screws 16, and the associated openings 112a and 112b locate the neutral busbar 12, base 40, and securing plate 64 in a fixed position and secure the components firmly in a fixed relation. Securing plate 60 also includes unthreaded openings 62a, 62b. One of ordinary skill in the art would understand that other securing means than screws 16, securing bolts 52, and hexagonal nuts 56 may secure the neutral busbar 12, base 40, and securing plate 60. Further, the securing plate 64 may also be a busbar or grounded busbar. A third neutral busbar may be secured to the second connection end tab 26 of the pi-shaped connector 20 with wire-binding screw 50.

Although the connection end tabs 25 of the pi-shaped connectors 20 are illustrated as being secured in the $1^{st}$ and $8^{th}$ bores of the first neutral busbar 11 by a wire-binding screw 50; they may be located in any of the bores of the first neutral busbar 11 without departing from the spirit or scope of the present invention. Further, the base 40 is illustrated as being secured in the $5^{th}$ and $13^{th}$ opening of the second neutral busbar 12, however they may be located in any of the openings of the second neutral busbar 12 without departing from the spirit or scope of the present invention. Although the pair of pi-shaped connectors 20 and base 40 are illustrated and described, the neutral busbars 11, 12 may be secured together with more than two pi-shaped connectors 20 and/or with an elongated base 40.

Figure 5:
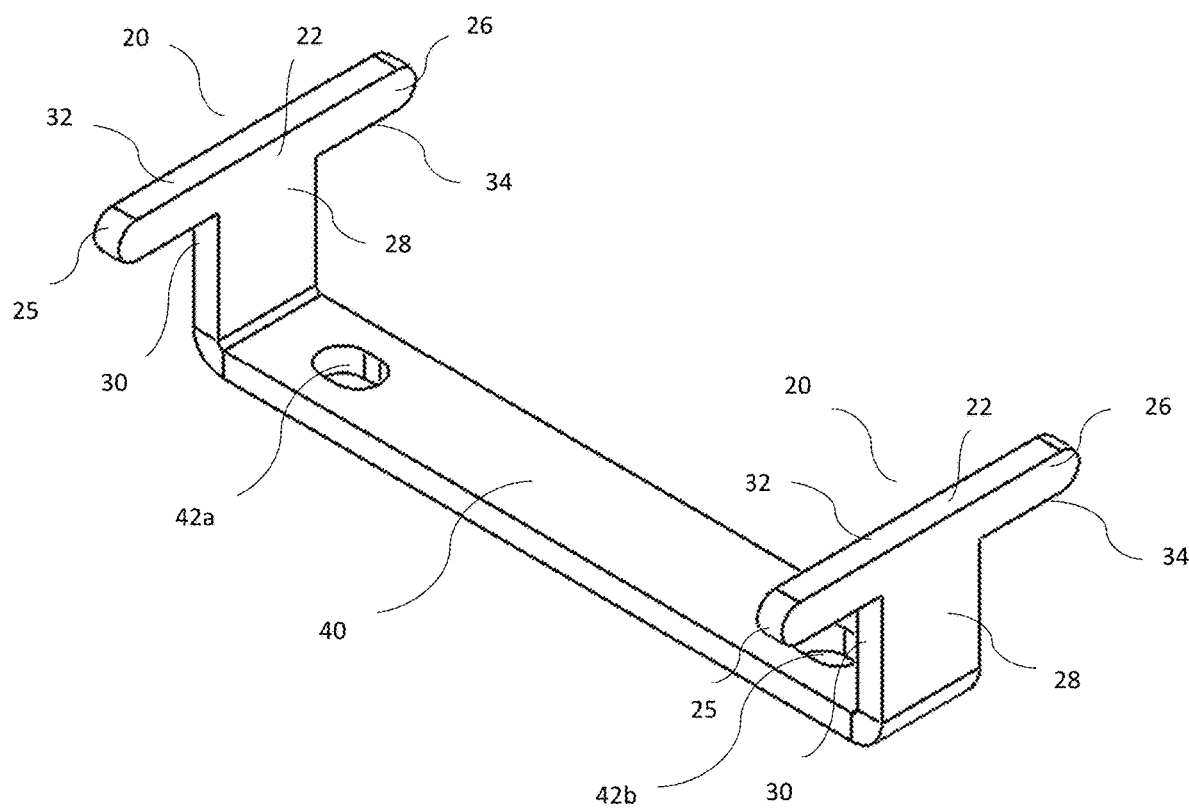
FIG. 5 is a perspective view of an embodiment of a neutral busbar stand assembly including T-shaped connectors and neutral busbars.

In accordance with an embodiment of the present invention, FIG. 5 illustrates a neutral busbar stand assembly including a pair of connectors 20 joined to base 40 and cast or extruded from aluminum or copper. Base 40 may include openings 42a and 42b. The opening 42a and 42b may be threaded and engages a threaded portion of a securing screw. Alternatively, opening 42a and 42b may be smooth. Each of the connectors 20 may be generally T-shaped and have a top portion 22, a pair of connection end tabs 25 and 26, and a leg portion 28. Each of the T-shaped connectors 20 may be joined to base 40 in a generally perpendicular manner. One of ordinary skill in the art would understand though, that the T-shaped connectors 20 may be joined to base 40 at various angles to accommodate different configurations and/or size and shapes of neutral busbars. Each of the leg portions 28 of the T-shaped connectors 20 extends downwardly from the bottom of the top portion 22 to base 40, where the top portion 22 and leg portion 28 form a substantially T-shape configuration. The leg portion 28 of each of the connectors 20 may generally be parallel to each other. One of ordinary skill in the art would understand though that the leg portions 28 of each of the connectors 20 may also be at various angles relative to each other to accommodate different configurations and/or size and shapes of neutral busbars. A top portion of the leg portion 28 which extends downwardly from the bottom of the top portion 22 to base 40 includes a front surface or shoulder 30 which functions to provide a stop preventing the first neutral busbar 11 and a third neutral busbar from moving further inwardly.

The T-shaped connectors 20 has a generally planar top surface 32, a generally planar bottom surface 34, and a pair of generally planar side surfaces 36, which define the width of the pi-shaped connector 20. Extending outwardly to the left from the top portion 22 of the body portion 21 is a first connection end tab 25. Extending outwardly to the right from the top portion 22 of the body portion 21 is a second connection end tab 26. The first connection end tab 25 is located in line with the second connection end tab 26 and above the leg portions 28. One of ordinary skill in the art, however, would understand that the first connection end tab 25 may be angled from the second connection end tab 26 and thus not in line with each other. This variation would accommodate various configurations of neutral busbars. Adjacent to the leg portion 28 of the T-shaped connector 20 is a span in which the second neutral busbar is located. In this embodiment of the present invention, the T-shaped connectors 20 are of a uniform width and each of the first and second connection end tabs 25, 26 has a generally rectangular cross-sectional configuration. One of ordinary skill in the art would understand that the cross-sectional configuration of first and second connection end tabs 25, 26 may also be circular or any suitable shape to fit within a bore of a neutral busbar.

The configuration of the T-shaped connectors 20 and base 40 functions to position up to three neutral busbars relative to each other such that an electrician may easily see and access wiring or cables received into each opening. Further, the shoulder 30 abuts a front surface of the first neutral busbar, thereby preventing the first neutral busbar from moving inwardly past the shoulder 30 or downwardly and ensuring adequate spacing between the first, second, and third neutral busbars. That is, for example, the first connection end tabs 25 may fit in the bores of a first neutral busbar, second connection end tabs 26 may fit in the bores of a second neutral busbar, and a third neutral busbar may be mounted on base 40 by securing screws or bolt and nut, through openings 42a and 42b.

One method of making the neutral busbar stand assembly of the present invention includes adding at least one neutral busbar to a stand assembly and mounting to a grounded busbar or an electrical enclosure. In this method, one of the connection end tabs of the pi-shaped neutral connectors is inserted into one of the bores of each neutral busbar to be added. Then the remaining connection end tabs of each of the pi-shaped connectors are inserted into the bores of the already mounted neutral busbar and secured therein by tightening the appropriate wire-binding screws. Another method of making the neutral busbar of the present invention is the join all the neutral busbars together into an assembly before the assembly is mounted in the electrical enclosure.

One method of making the pi-shaped connectors of the present invention as shown in FIG. 3, is to extrude a length of electrically conductive material from bar stock through an extruder. Once the length of electrically conductive material has been extruded such that the result has the desired shape, the length is cut in a transverse direction such that the resultant pi-shaped connectors have a desired width. Another method of making the pi-shaped connectors of the present invention is that each of the pi-shaped connectors is cast from aluminum or copper. One method of making the stand assembly of the present invention is that the pi-shaped connectors are welded to the base, but may also be secured via other means.

While the present invention has been illustrated by a description of various embodiments and while these embodiments have been described in considerable detail, it is not the intention of applicant to restrict or in any way limit the scope of the appended claims to such detail. Further, the various embodiments may be combined or modified as contemplated by one skilled in the art. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of applicant's general inventive concept.

What is claimed is:

1. A neutral busbar stand assembly, comprising:
   a pair of connectors fixing a position of at least one neutral busbar, each connector including:
      a top portion having a first and second connection end tabs, and
      at least one downwardly extending leg from the top portion; and
   a base joining the pair of connectors via the at least one downwardly extending leg of each of the pair of connectors.

2. The neutral busbar stand assembly of claim 1, wherein the first connection end tabs on a first side of the top portion of the pair of connectors are received in respective wire-receiving bores of a first neutral busbar.

3. The neutral busbar stand assembly of claim 2, wherein the second connection end tabs on a second side opposite to the first side of the top portion of the pair of connectors are received in respective wire-receiving bores of a second neutral busbar thereby electrically connecting the first and second neutral busbars to each other.

4. The neutral busbar stand assembly of claim 3, wherein a third neutral busbar is removably mounted on the base of the stand assembly, thereby electrically connecting the first, second, and third neutral busbars to each other.

5. The neutral busbar stand assembly of claim 4, wherein the first neutral busbar and the second neutral busbar each includes:
   a plurality of bores extending through the neutral busbar, and
   a plurality of threaded openings, each of the threaded openings extending downwardly into one of the plurality of bores.

6. The neutral busbar stand assembly of claim 5, wherein the plurality of bores are configured to receive wires.

7. The neutral busbar stand assembly of claim 6, wherein a plurality of wire-binding screws are engaged in the threaded openings and when rotated advance into the bores of the neutral busbar, thereby trapping or securing the wires between the bottom of the bores and the bottoms of the wire-binding screws.

8. The neutral busbar stand assembly of claim 4, wherein each of the pair of connectors further includes another downwardly extending leg for a pair of downwardly extending legs.

9. The neutral busbar stand assembly of claim 8, wherein the top portion and the pair of downwardly extending legs form a pi-shaped connector.

10. The neutral busbar stand assembly of claim 9, wherein the third neutral busbar is mounted between the pair of the downwardly extending legs of each of the pair of pi-shaped connectors.

11. The neutral busbar stand assembly of claim 8, wherein each of the neutral busbars are made of an electrically conductive material and are constructed by at least one of: die cast, stamped, or extruded.

12. The neutral busbar stand assembly of claim 8, wherein each of the neutral busbars is generally elongated in overall shape with a rectangular transverse cross-section, having generally planar, parallel front and rear surfaces, generally planar, parallel top and bottom surfaces, and generally planar, parallel end surfaces.

13. The neutral busbar stand assembly of claim 4, wherein the base includes through openings and is secured to a busbar which includes threaded openings to which mounting screws secure the third neutral busbar and base of the stand assembly to the busbar.

14. The neutral busbar stand assembly of claim 1, wherein the neutral busbar stand assembly is made from at least one of aluminum or copper.

15. A neutral busbar stand assembly, comprising:
a first neutral busbar;
a second neutral busbar positioned above and left of the first neutral busbar;
a third neutral busbar positioned above and right of the second neutral busbar,
wherein each of the first, second, and third neutral bars includes:
a plurality of spaced bores extending through the neutral bar and a plurality of spaced threaded openings, each of the threaded openings extending downwardly into one of the plurality of spaced bores, and
a plurality of wire binding screws threadably engaged in the threaded openings;
a pair of connectors fixing a position of the first, second, and third neutral busbars relative to each other, each of the pair of connectors including:
a top portion having a first and second connection end tabs, the first and second connection end tabs being secured in a bore of one of the second or third neutral bar by a wire binding screw; and
at least one downwardly extending leg from the top portion of the connector; and
a base joining the pair of connectors via the at least one downwardly extending leg.

16. The neutral busbar stand assembly of claim 15, wherein each of the plurality of spaced bores being adapted to receive a wire from behind the neutral bar.

17. The neutral busbar stand assembly of claim 15,
wherein each of the pair of connectors further includes another downwardly extending leg for a pair of downwardly extending legs,
wherein the top portion and the pair of downwardly extending legs form a pi-shaped connector, and
wherein the first neutral busbar is mounted on the base and between the pair of the downwardly extending legs of each of the pair of pi-shaped connectors.

18. The neutral busbar stand assembly of claim 15, wherein the base of the stand assembly is mounted on a busbar, wherein mounting screws are inserted in openings of the base and threaded openings of the busbar, and wherein the base is secured to the busbar by rotating the mounting screws in the threaded openings of the busbar.

19. The neutral busbar stand assembly of claim 15, wherein mounting screws are inserted in the openings of the second neutral busbar and wherein the second neutral busbar is secured to the base and the busbar by rotating the mounting screws in the threaded openings of the busbar.

20. A neutral busbar stand assembly, comprising:
a pair of connectors fixing positions of a plurality of neutral busbar relative to each other, each of the pair of connectors including:
a top portion having a first and second connection end tabs, the first and second connection end tabs being secured in a bore of a neutral bar by a wire binding screw, and
at least one downwardly extending leg from the top portion of the connector; and
a base joining the pair of connectors via the downwardly extending leg, wherein a neutral busbar is mounted on the base.

* * * * *